US012798231B2

(12) United States Patent
Kiuchi et al.

(10) Patent No.: US 12,798,231 B2
(45) Date of Patent: Nov. 17, 2026

(54) PRINTING APPARATUS, CONTROL METHOD, AND STORAGE MEDIUM

(71) Applicant: CANON KABUSHIKI KAISHA, Tokyo (JP)

(72) Inventors: Takahiro Kiuchi, Tokyo (JP); Tomoya Hara, Kanagawa (JP); Masaaki Matsuura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 18/376,176

(22) Filed: Oct. 3, 2023

(65) Prior Publication Data

US 2024/0109287 A1 Apr. 4, 2024

(30) Foreign Application Priority Data

Oct. 4, 2022 (JP) ................................ 2022-160330

(51) Int. Cl.
*B41J 2/045* (2006.01)
*B41J 11/00* (2006.01)
*B41J 13/03* (2006.01)

(52) U.S. Cl.
CPC ......... *B41J 2/0451* (2013.01); *B41J 2/04586* (2013.01); *B41J 11/003* (2013.01); *B41J 11/0095* (2013.01); *B41J 13/03* (2013.01)

(58) Field of Classification Search
CPC ..... B41J 11/0025; B41J 11/003; B41J 11/006; B41J 11/0095; B41J 13/0009; B41J 13/0018; B41J 2/0451
See application file for complete search history.

(56) References Cited

U.S. PATENT DOCUMENTS

| | | | |
|---|---|---|---|
| 9,827,791 | B2 | 11/2017 | Shinohara et al. |
| 9,868,297 | B2 | 1/2018 | Kako |
| 10,815,087 | B2 | 10/2020 | Tsuboi |
| 10,857,819 | B2 | 12/2020 | Hattori et al. |
| 11,198,576 | B2 | 12/2021 | Matsuo et al. |

(Continued)

FOREIGN PATENT DOCUMENTS

| | | | |
|---|---|---|---|
| JP | 07-72766 | A | 3/1995 |
| JP | 2004-292124 | A | 10/2004 |

(Continued)

OTHER PUBLICATIONS

U.S. Appl. No. 18/376,080, Tomoya Hara Takahiro Kiuchi Masaaki Matsuura, filed Oct. 3, 2023, NYA.

(Continued)

*Primary Examiner* — Stephen D Meier
*Assistant Examiner* — Thomas Ray Knief
(74) *Attorney, Agent, or Firm* — Venable LLP

(57) ABSTRACT

A printing apparatus, whose usability is not diminished, includes a storage unit configured to store size information of a print medium; a plurality of rollers arranged in a conveyance path of a print medium and configured to convey the print medium; a sensor configured to detect an edge of the print medium being conveyed by the rollers; and a control unit configured to execute processing for identifying an error occurring in the conveyance of the print medium. The control unit issues an error concerning an orientation of the print medium based on a detection result of the sensor and the size information stored in the storage unit.

13 Claims, 11 Drawing Sheets

(56) References Cited

U.S. PATENT DOCUMENTS

| | | | | |
|---|---|---|---|---|
| 11,407,603 | B2 * | 8/2022 | Fujino | B65H 5/06 |
| 2005/0105947 | A1 * | 5/2005 | Kim | B41J 13/103<br>400/76 |
| 2008/0240832 | A1 * | 10/2008 | Kugimachi | B41J 13/0018<br>400/582 |
| 2016/0288557 | A1 * | 10/2016 | Kako | B41J 3/46 |
| 2017/0253053 | A1 * | 9/2017 | Shinohara | B41J 11/007 |
| 2017/0341889 | A1 * | 11/2017 | Kikuta | B65H 1/04 |
| 2018/0099827 | A1 * | 4/2018 | Tsuboi | B41J 13/0018 |
| 2018/0335718 | A1 * | 11/2018 | Chikugo | G03G 15/607 |
| 2023/0294426 | A1 | 9/2023 | Sugiyama et al. | |

FOREIGN PATENT DOCUMENTS

| | | | |
|---|---|---|---|
| JP | 2015-066789 | A | 4/2015 |
| JP | 2016-159997 | A | 9/2016 |
| JP | 2016-190328 | A | 11/2016 |
| JP | 2017-154351 | A | 9/2017 |
| JP | 2017-214186 | A | 12/2017 |
| JP | 2018-058689 | A | 4/2018 |

OTHER PUBLICATIONS

Office Action dated Jun. 30, 2026, in Japanese Patent Application No. 2022-160330.

* cited by examiner

PRINTING APPARATUS, CONTROL METHOD, AND STORAGE MEDIUM

BACKGROUND

Field

The present disclosure relates to a technique for feeding and conveying print media such as sheets in a printing apparatus.

Description of the Related Art

In order for a printing apparatus to support various print media sizes, it is desirable to arrange all conveyance rollers along a print medium conveyance direction such that a distance between every two neighboring conveyance rollers (referred to as an inter-roller distance) is equal to or smaller than the longitudinal length of a print medium of a minimum size. This is for the purpose of transferring the print medium between the neighboring conveyance rollers. In another measure, the inter-roller distances may be further shortened. However, this measure leads to an increase in the number of rollers or shortening of the length of a conveyance path itself. As a result, the above measure has a cost problem and places a constraint on an apparatus size.

Against this background, a printing apparatus is designed such that the inter-roller distance is equal to or smaller than the longitudinal length of a print medium of a minimum size. However, some print media have short-side lengths smaller than the inter-roller distance. In this case, if a user sets such a print medium in an incorrect orientation, the conveyance of the print medium has a problem. Specifically, in a case where the user mistakenly sets a print medium in a feeder unit such that the short-side direction of the print medium is aligned with the conveyance direction, the feeding of the set print medium incurs a possibility that the print medium may be left behind between neighboring rollers and disabled from being conveyed any further.

As a technique for handling such a problem caused by a print medium left behind between rollers, Japanese Patent Laid-Open No. H07-72766 discloses a technique for detecting an incorrect setting of a print medium by using two sensors arranged on a print medium loading surface, and disabling a print medium from being conveyed if an incorrect setting is detected.

SUMMARY

As a method of handling the aforementioned problem caused by the incorrect setting without additional provision of the sensors as in Japanese Patent Laid-open No. H07-72766, there is a method in which, in a state where the print medium is left behind between the rollers, a print medium correctly set is fed to push out the print medium left behind. However, this method is difficult to notice. Users have to check explanations written in a manual, or only users who make inquiries to a customer center can implement this method. Therefore, there is a problem from the viewpoint of usability.

In view of the above problem, the present disclosure has an object to provide a printing apparatus with usability prevented from being lowered.

An embodiment of the present disclosure is a printing apparatus comprising: a storage unit configured to store size information of a print medium; a plurality of rollers arranged in a conveyance path of a print medium and configured to convey the print medium; a first sensor configured to detect an edge of the print medium being conveyed by the rollers; and a control unit configured to execute processing for identifying an error occurring in the conveyance of the print medium, wherein the control unit issues a first error concerning an orientation of the print medium based on a detection result of the first sensor and the size information stored in the storage unit.

Further features of the present invention will become apparent from the following description of exemplary embodiments with reference to the attached drawings.

DESCRIPTION OF THE EMBODIMENTS

Hereinafter, embodiments will be described in detail with reference to the accompanying drawings. The following embodiments are not intended to limit the invention according to claims more than necessary. Although multiple features are described in each of the embodiments, not all of these multiple features are essential to achieve the idea of the disclosure, and some of the features may be combined as desired. In addition, in the accompanying drawings, the same or similar constituent elements will be designated with the same reference sign, and repetitive description thereof will be omitted in some cases.

In the present specification. “printing” not only means to form meaningful information such as characters and graphics, but also broadly means to form an image, a design, a pattern, or the like on a print medium or process a medium regardless of whether or not the formed product is meaningful and also regardless of whether or not the formed product is noticeable so that humans can perceive it visually. Also, “printing” is sometimes called “character printing” or “recording”.

Moreover. “print media (sheets)” include not only print paper for use in general image forming apparatuses, but also a wide range of conveyable media, by using the printing apparatus, such as cloth, plastic film (OHP), metal plate, glass, ceramics, wood, and leather.

First Embodiment

<General Overview of Inkjet Printing Apparatus>

First, a general overview of an ink jet printing apparatus (hereinafter simply referred to as the "printing apparatus") according to an embodiment will be described.

Figure 1:
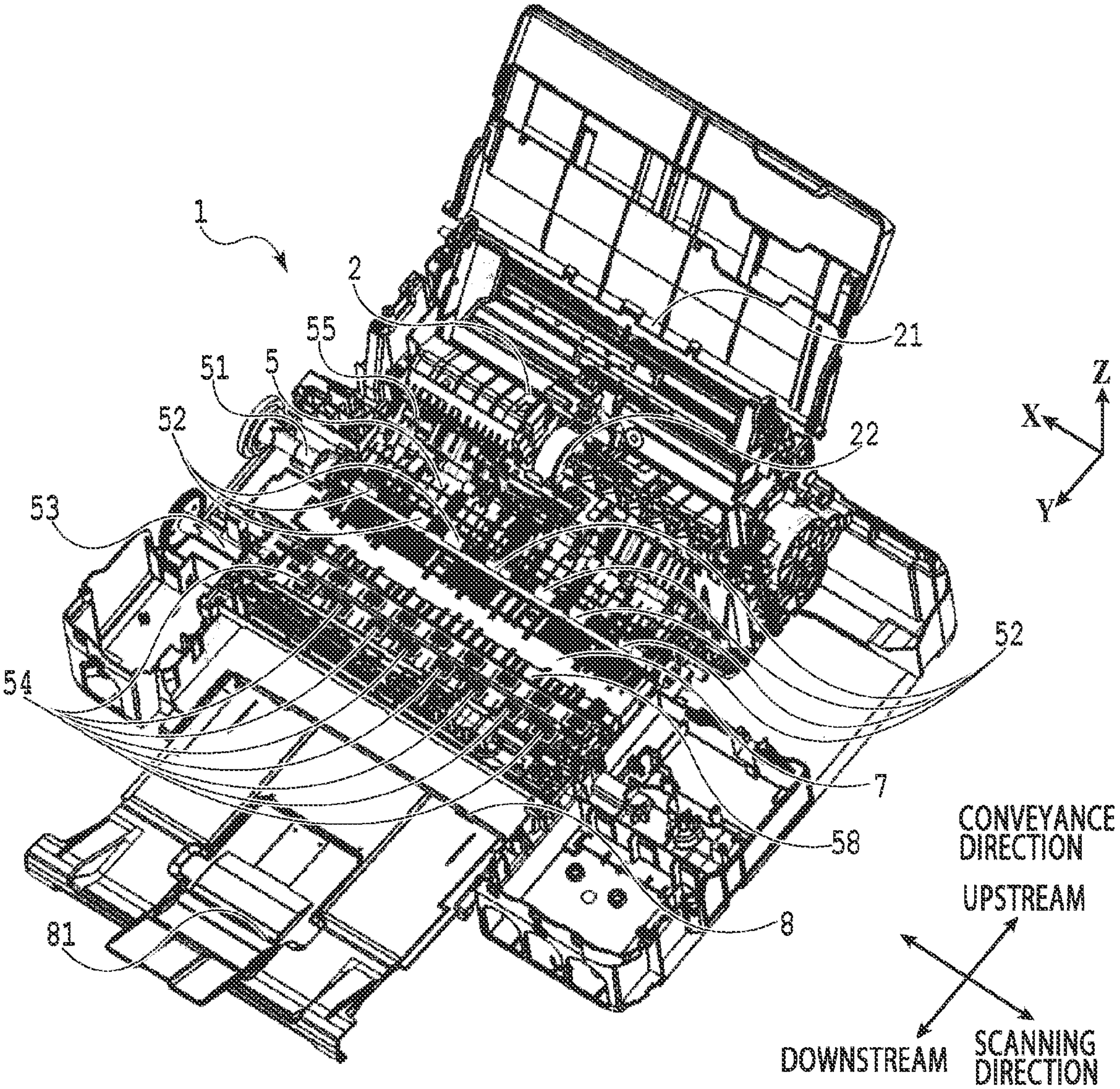
FIG. 1 is a perspective view illustrating an appearance of an ink jet printing apparatus.

FIG. 1 is a perspective view illustrating a general overview of a printing apparatus according to the present embodiment. A printing apparatus 1 includes a feeder unit 2 that separates and feeds provided print media one by one, a conveyance unit 5 that conveys the print medium fed by the feeder unit 2, and a printing unit 7. The printing apparatus 1 also includes a driving motor 6 (not illustrated in FIG. 1, see FIG. 6), and a delivery unit 8 that delivers and stacks print media after the printing by printing unit 7 is completed.

The feeder unit 2 includes a loading unit 21 on which print media are loaded, and a feed roller 22 that feeds the print media loaded on the loading unit 21. The conveyance unit 5 includes a conveyance roller 51, pinch rollers 52 facing the conveyance roller 51, an output roller 53, and conveyance spurs 54 facing the output roller 53. The delivery unit 8 includes an output paper tray 81 on which print media output by the output roller 53 are stacked.

A print medium fed from the feeder unit 2 by the feed roller 22 is nipped between the conveyance roller 51 and the pinch rollers 52 urged toward the conveyance roller 51 by a pinch roller holder 55, and is conveyed to the printing unit 7. On the print medium conveyed to the printing unit 7, an image printing is performed by ejecting inks from nozzles (not illustrated) in a print head (not illustrated). In the printing unit 7, the print head is capable of performing a printing operation on any position of a print medium in an X direction (also referred to as a print medium width direction) by reciprocating along a scanning direction in FIG. 1. The print medium on which the image is printed by the printing unit 7 is output to the output paper tray 81 by the output roller 53 and the conveyance spurs 54 that function as an output unit. Here, regarding a conveyance path extending from the feeder unit 2, passing through the conveyance unit 5, and reaching the delivery unit 8, the conveyance path on a feeder unit 2 side is referred to as an "upstream side" and the conveyance path on a delivery unit 8 side is referred to as a "downstream side".

The driving motor 6 has a driving system connected to the conveyance roller 51, the output roller 53, and the feeder unit 2 through gear trains (not illustrated) and drives and rotates each of them. Here, a driving direction of the driving motor 6 rotating the conveyance roller 51 in a direction to convey the print medium to the downstream side is referred to as a "forward direction". Meanwhile, a driving direction of the driving motor 6 rotating the conveyance roller 51 in a direction to convey the print medium to the upstream side is referred to as a "reverse direction".

Between the feeder unit 2 and the conveyance unit 5, the pinch roller holder 55 and a guide unit 56 (not illustrated) are arranged respectively on an upper side (on a +Z direction side) and on a lower side (on a −Z direction) on the basis of the conveyance path of the print medium in FIG. 1, and each guide the print medium being conveyed. In addition, between the conveyance roller 51 and the output roller 53, a platen 58 is arranged on the lower side (on the −Z direction side) below the conveyance path of the print medium in FIG. 1, and guides the print medium conveyed to the printing unit 7 so as to keep a constant distance between the print medium and the nozzles.

<Structure of Feeder Unit>

Figure 2:
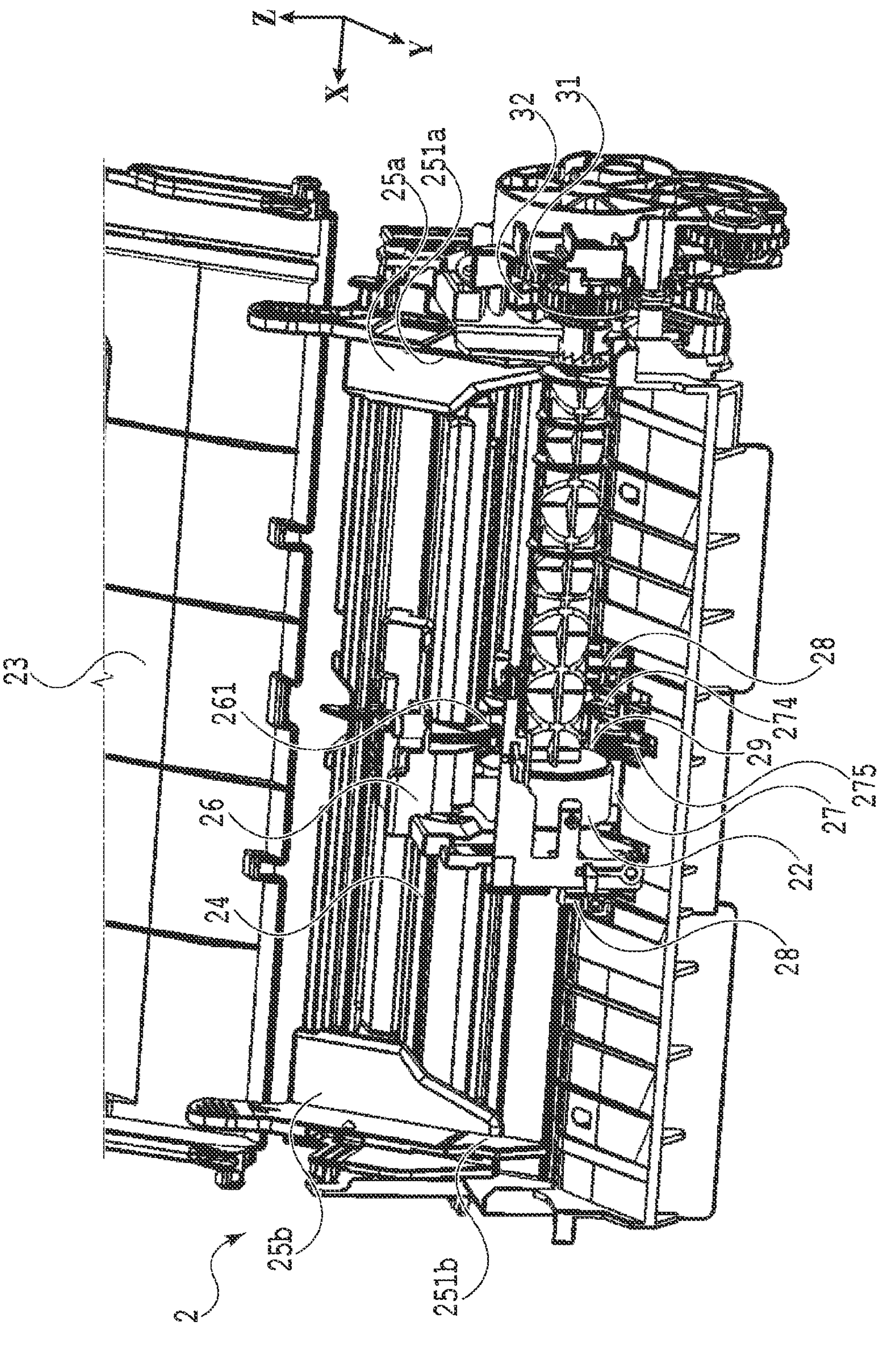
FIG. 2 is a perspective view of a feeder unit.
Figure 3:
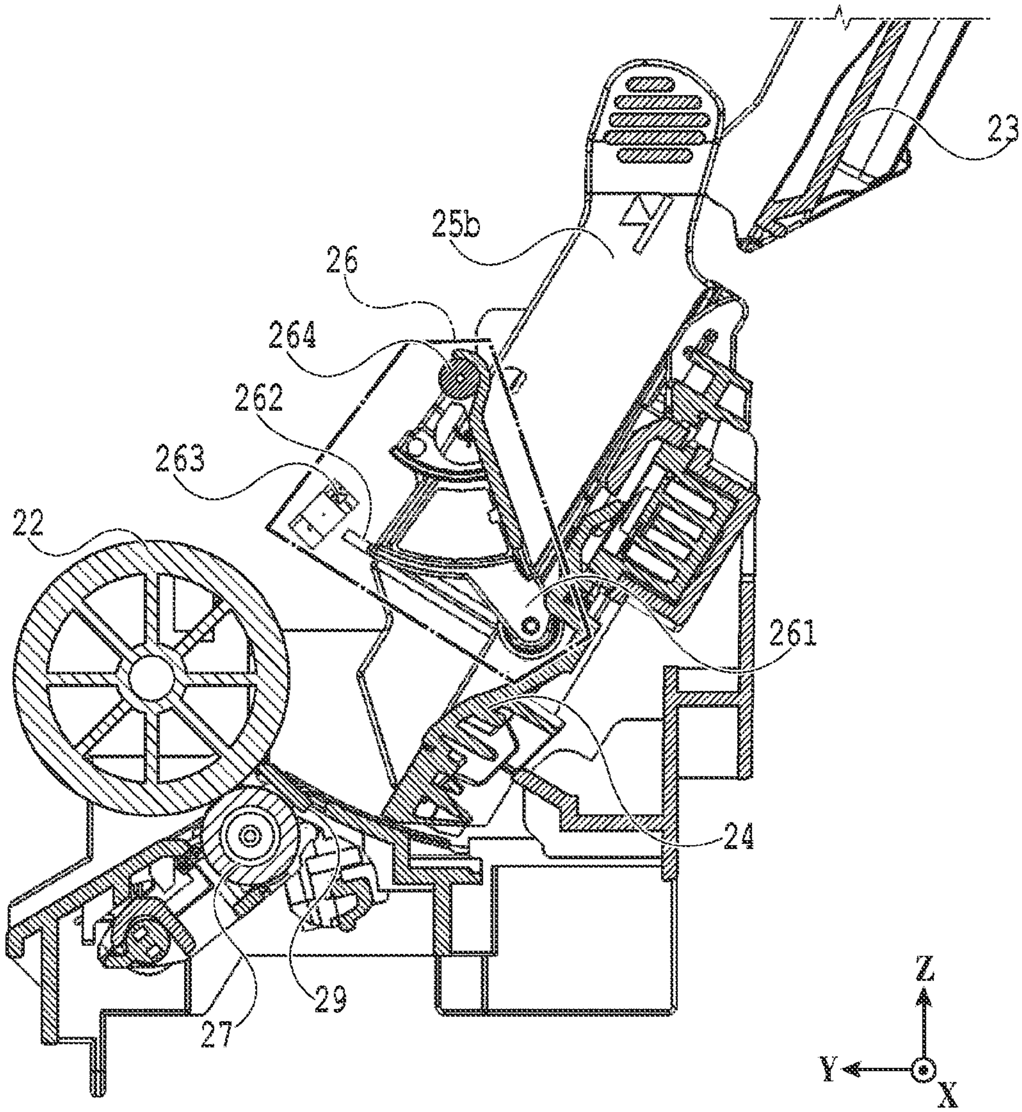
FIG. 3 is a cross-sectional view of the feeder unit.

FIG. 2 is a perspective view of the feeder unit 2. FIG. 3 is a cross-sectional view of the feeder unit 2 as seed in the X direction. The feeder unit 2 includes a print media loading unit, a separate-feeding unit, and a driving unit.

The print media loading unit includes a tray 23, a pressure plate 24, side guides 25*a* and 25*b*, and a loading detection unit 26. The pressure plate 24 is a pressing plate that applies a conveyance force to a print medium. The pressure plate 24 is turned and urged in a direction toward the feed roller 22 by a pressure plate spring (not illustrated), and is turned and moved in a direction away from the feed roller 22 by being pressed by a cam provided to the driving unit. A print medium feeding operation is performed by these urging and separating operations.

The pressure plate 24 is fixed at a predetermined position in the direction away from the feed roller 22 in a so-called stand-by status, that is, a status in which the feeder unit 2 is not conveying a print medium. In the state where the pressure plate 24 is located at the predetermined position, a gap large enough to load multiple print media is secured between the feed roller 22 and the pressure plate 24.

Figure 4:
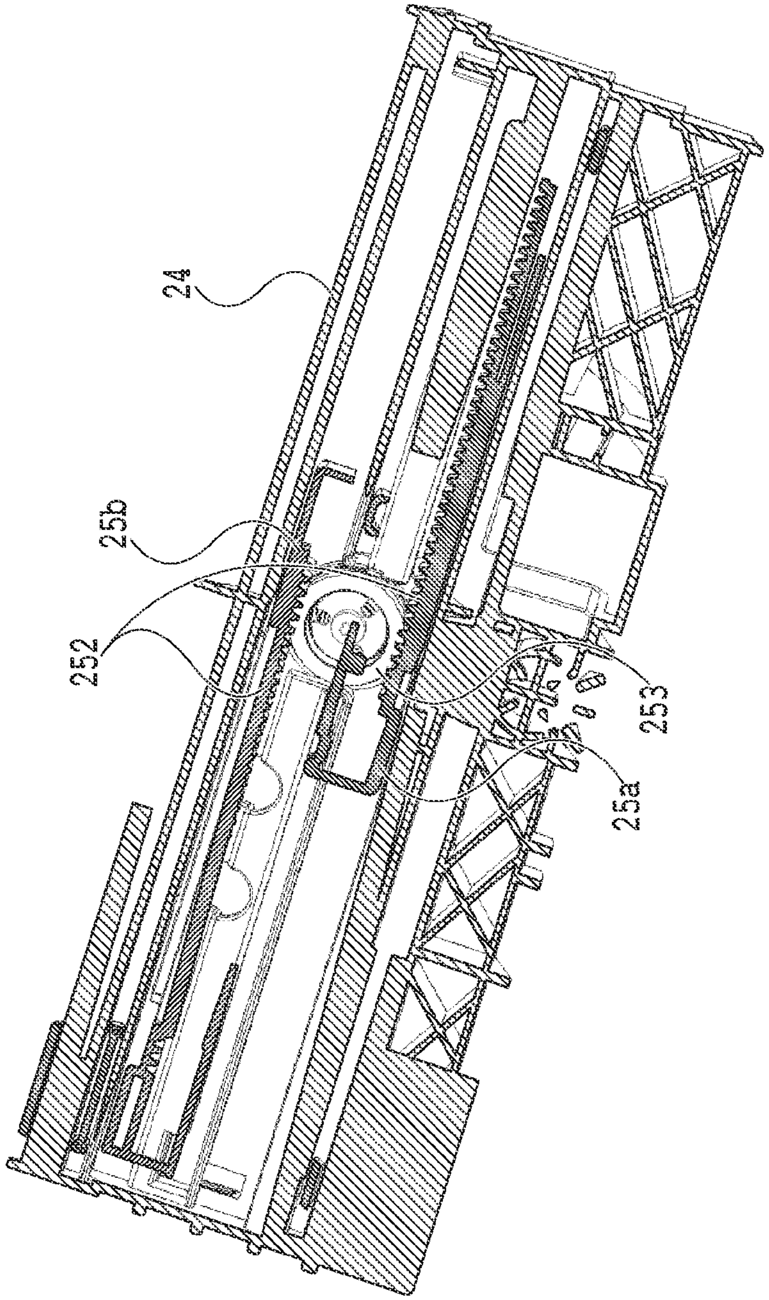
FIG. 4 is a cross-sectional view taken along a direction parallel to a print medium loading surface of a pressure plate.

FIG. 4 is a cross-sectional view taken along a direction parallel to the print medium loading surface of the pressure plate 24. The side guides 25*a* and 25*b* are attached to the pressure plate 24 in a slidable manner, and rack portions 252 of the side guides 25*a* and 25*b* are interlocked with a side guide gear 253, so that the side guides 25*a* and 25*b* can move in conjunction with each other. The side guide gear 253 is urged by a side guide spring (not illustrated) in a direction perpendicular to a rotation direction. With this, the side guides 25*a* and 25*b* are allowed to operate only in a case of receiving an operating force at a certain level or higher, and can be fixed so as not to move accidentally in other cases such as performing the urging and separating operations of the pressure plate 24, receiving a vibration due to a driving source, and transporting the printing apparatus by the user.

After multiple print media are loaded in the gap between the feed roller 22 and the pressure plate 24, the side guides 25*a* and 25*b* are moved and adjusted to the width of the print media so that restriction surfaces 251*a* and 251*b* of the side guides 25*a* and 25*b* can restrict the sides of the print media in the width direction. As a result, the movement of the loaded print media in the direction (print medium width direction) orthogonal to the print medium conveyance direction is restricted, so that the printing apparatus can be adapted to any print medium width within a predetermined width range, and can stably convey print media with different widths.

As illustrated in FIG. 3, the loading detection unit 26 includes a loading detection lever 261 and an optical sensor 263 that functions as a loading detection sensor 808 (see FIG. 8) to be described later. The loading detection lever 261 is turnably arranged above the pressure plate 24 and is urged in a direction toward the pressure plate 24 by a loading detection spring 264. The loading detection lever 261 is molded by using a material not transmitting infrared rays, and includes a flag portion 262 configured to change an output of the optical sensor 263 by passing between a light emitting portion and a light receiving portion of the optical sensor 263, so that the position of the loading detection lever 261 is detectable. In a state where no print medium is loaded on the loading unit 21, the flag portion 262 is located outside the light emitting portion and the light receiving portion of the optical sensor 263, so that the detection of the optical sensor 263 is off. In a state where print media are loaded on the loading unit 21, the tip end of the loading detection lever 261 is in contact with the loaded print media and the loading detection lever 261 is turned to locate the flag portion 262 between the light emitting portion and the light receiving portion of the optical sensor 263, so that the detection of the optical sensor 263 is on. In this way, whether or not print media are loaded on the loading unit 21 can be determined.

Next, a configuration of the separate-feeding unit will be described. With the above-described operation of the pressure plate 24, the loaded print media are pressed against the feed roller 22. The feed roller 22 is driven to rotate in the case where the print media are pressed, and the top print medium in contact with the feed roller 22 among the print media is conveyed with a frictional force of the feed roller 22. Since the feed roller 22 feeds the print medium by using the frictional force, the feed roller 22 is preferably formed of a material such as a rubber having a high frictional coefficient such as EPDM, or a foam urethane.

Here, since the frictional force between the feed roller 22 and the top print medium is greater than the frictional force between the top print medium and the print medium immediately below in most cases, only the top print medium is conveyed in most cases. However, the feed roller 22 sometimes picks up two or more print media at a time in cases such as where the print media are affected by burrs at the edges of the print media generated in cutting of the print media, where the print media are sticking together due to static electricity, and where the print media with the surfaces having a very high frictional coefficient are used.

In this case, only the top print medium is separated by a separation roller 27 that functions as a separation unit including a torque limiter. The separation roller 27 is pressed against the feed roller 22 in a manner in contact with the feed roller 22 on a conveyance direction downstream side of a point at which the feed roller 22 first comes into contact with the print medium.

Figure 5:
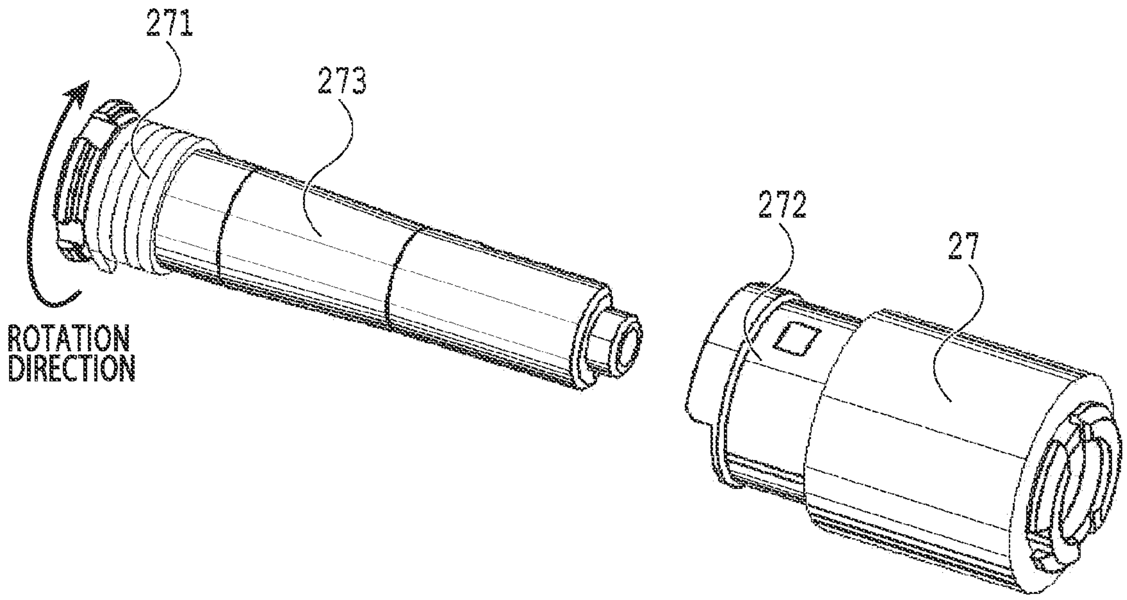
FIG. 5 is an exploded perspective view of a separation roller unit.

Here, a structure of the separation roller 27 will be described. FIG. 5 is an exploded perspective view of a separation roller unit. The separation roller 27 is fixedly attached to a clutch cylinder 272 and a clutch shaft 273 is rotatably housed in the clutch cylinder 272. A clutch spring 271 is wound around the clutch shaft 273, and one winding end of the clutch spring 271 is engaged with the clutch cylinder 272.

In the above structure, in a case where the separation roller 27 and the clutch cylinder 272 are rotated in an arrow direction in FIG. 5 with the clutch shaft 273 fixed, the clutch spring 271 wound around the clutch shaft 273 is released from the clutch shaft 273. The separation roller unit is structured to maintain a predetermined torque by allowing the clutch shaft 273 and the clutch spring 271 to slip relative to each other in a case where the separation roller 27 and the clutch cylinder 272 are rotated at just a predetermined angle.

In addition, the separation roller 27 is formed of a rubber, a foam urethane, or the like so that the surface of the separation roller 27 has a frictional coefficient approximately equal to that of the feed roller 22. The separation roller 27 is rotatably supported by a separation roller holder 274 functioning as a separation unit holding member via the clutch cylinder 272 and the clutch shaft 273 and is pressed against the feed roller 22 by a separation roller spring 275.

With this structure, the separation roller 27 is driven to rotate as the feed roller 22 rotates in a case where no print medium is placed between the feed roller 22 and the separation roller 27.

In a case where a single print medium enters between the feed roller 22 and the separation roller 27, the frictional force between the feed roller 22 and the print medium is greater than the frictional force between the print medium and the separation roller 27 driven with the predetermined torque. For this reason, the print medium is conveyed while the separation roller 27 is being driven. However, in a case where two print media enter between the feed roller 22 and the separation roller 27, the frictional force between the feed roller 22 and the print medium on the feed roller 22 side is greater than the frictional force between the print media. In this case, the frictional force between the separation roller 27 and the print medium on the separation roller side is greater than the frictional force between the print media, so that the print media slip on each other. As a result, only the print medium on the feed roller 22 side is conveyed and the print medium on the separation roller 27 side is not conveyed by stopping at that position as the rotation of the separation roller 27 stops.

Next, a structure of a multi-feeding prevention unit will be described. As described above, even in the case where about two print media enter the nip portion between the feed roller 22 and the separation roller 27, it is possible to separate the print media. However, a problem may occur in a case where more than two print media enter or a case where, after two print media enter and only the print medium on the feed roller 22 side is fed, the next print medium is continuously fed while the print medium remains near the nip portion. Specifically, there is a possibility of occurrence of a so-called multi-feeding in which multiple print media are fed at the same time. A multi-feeding prevention unit is provided in order to prevent such multi-feeding.

The multi-feeding prevention unit includes a return lever 28. During an operation of setting print media or in a printing stand-by status, the return lever 28 is inserted into the print medium conveyance path to prevent the leading edge of a print medium from accidentally entering the feeder unit deeply. The return lever 28 is structured to be released and retracted from the print medium conveyance path after the start of the feeding operation, and does not hinder the advance of the print medium during feeding.

After completion of the separation operation, the return lever 28 starts an operation of returning the print medium placed in a separation nip portion (between the feed roller 22 and the separation roller 27) by an action of a cam provided to a control gear 31. At this moment, a release cam 32 also moves a previous stage restriction holder 29 functioning as a previous stage restriction member and the separation roller holder 274 provided with the separation roller 27 in the direction away from the feed roller 22.

Owing to the operation of moving the previous stage restriction holder 29 and the separation roller holder 274 in the direction away from the feed roller 22, the operation of returning the print medium by the return lever 28 can be performed with a small force.

The return lever 28 is structured to once turn to a position retracted from the print medium conveyance path after completing the operation of returning the print medium, and again return to the position in the stand-by status after the feeding from the feeder unit 2 is completed.

<Structures of Conveyance Unit and Conveyance Path>

Figure 6:
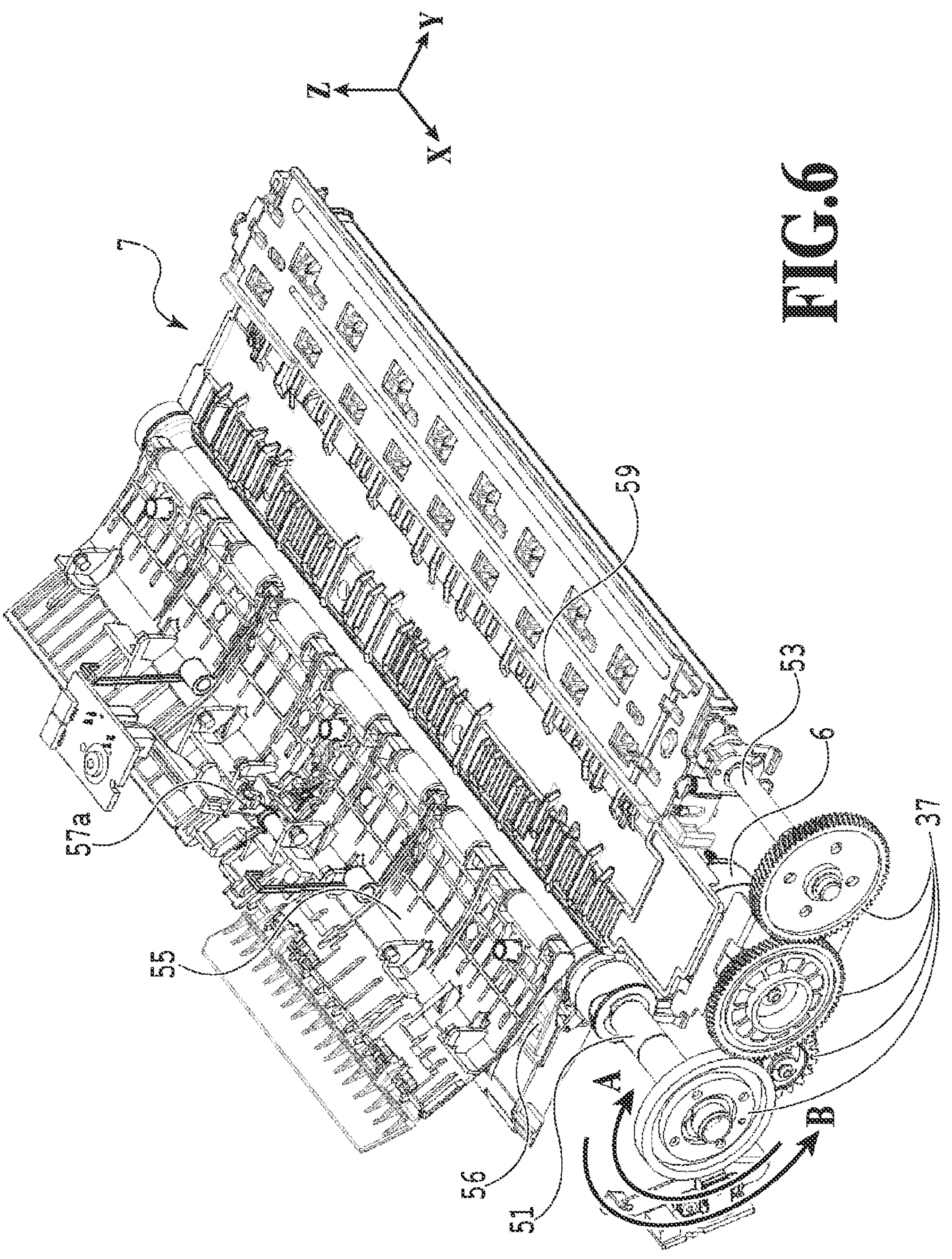
FIG. 6 is a perspective view of a conveyance unit.
Figure 7:
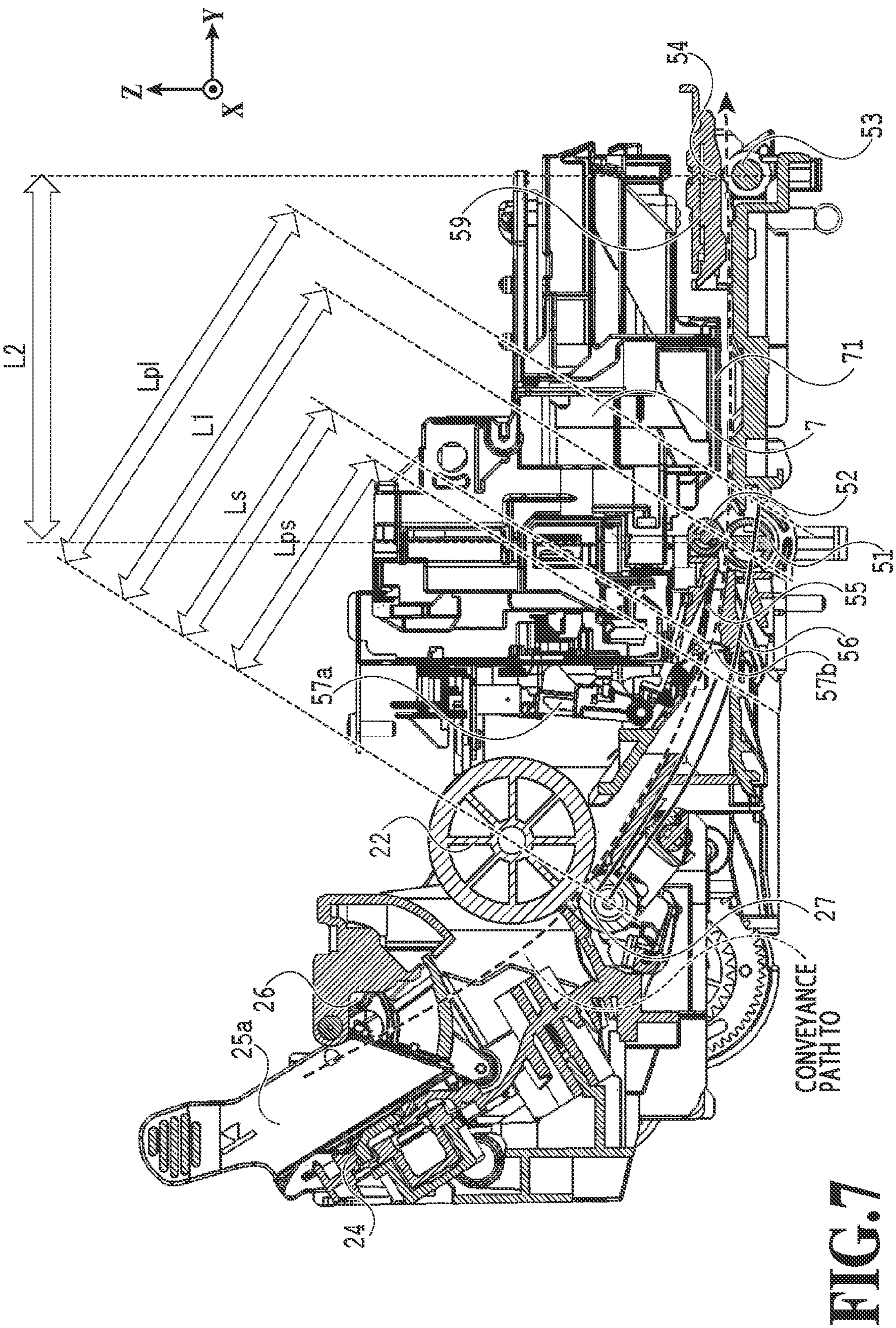
FIG. 7 is a cross-sectional view of the conveyance unit illustrating a conveyance path.

FIG. 6 is a perspective view of the conveyance unit. FIG. 7 is a cross-sectional view of the conveyance unit as seen in the width direction, which illustrates the conveyance path from the feeder unit to the delivery unit.

The conveyance roller 51 and the output roller 53 are linked to each other via the driving motor 6 and a gear train 37. In a case where the driving motor 6 rotates the conveyance roller 51 in a direction of an arrow A in FIG. 6, the conveyance roller 51 and the output roller 53 each rotate in a direction to convey the print medium to the conveyance direction downstream side (that is, the forward direction). In a case where the driving motor 6 rotates the conveyance roller 51 in a direction of an arrow B in FIG. 6, the conveyance roller 51 and the output roller 53 each rotate in a direction to convey the print medium to the conveyance direction upstream side (that is, the reverse direction). The speed and the driving amount of the driving motor 6 are controlled by detecting the driving amount with an encoder (not illustrated) and performing various controls such as PID control.

The print medium fed by the feeder unit 2 is guided by the pinch roller holder 55 and the guide unit 56 and is fed to the conveyance roller 51. An edge detection lever 57*a* is provided to the pinch roller holder 55. During an operation of conveying the print medium through the conveyance path, the edge detection lever 57*a* is turned, so that the leading edge position or rear edge position of the print medium is detected. In the feeding operation, the leading edge position of the print medium is detected, and the printing operation based on the detection result is performed. In the case where the rear edge position is detected in the outputting operation, the length of the print medium can be derived based on the driving amount of the driving motor 6 required from the detection of the leading edge position to the detection of the rear edge position.

The print medium fed to the conveyance roller 51 is subjected to a skew correction operation and the like, and then is conveyed to the printing unit 7, and printing is performed on the print medium by a print head 71 provided to the printing unit 7. The print medium conveyed from the conveyance roller 51 is guided by the platen 58 and a spur base 59 and then reaches the output roller 53. During the printing operation on the print medium, one or both of the conveyance roller 51 and the output roller 53 perform a conveying operation. After completion of the printing operation, the print medium is output to the output paper tray 81 by the output roller 53.

In a feeding and outputting operation to be described later, successive execution of a feeding operation requires that a feeding preparation operation be executed after completion of the feeding operation. For this purpose, the conveyance roller 51 is rotated in the direction of the arrow B. As a result, the conveyance roller 51 and the output roller 53 convey the print medium to the conveyance direction upstream side.

<Detection of Incorrect Setting of Print Medium>

As illustrated in FIG. 7, in the printing apparatus in the present embodiment, a distance L1 between the feed roller 22 and the conveyance roller 51 and a distance L2 between the conveyance roller 51 and the output roller 53 are determined as follows. It should be noted that L1 and L2 are drawn as linear distances in FIG. 7, but they are for the sake of simplification and are actually distances along the conveyance path. Similarly, the size of the print medium to be described below is also expressed as a length along the conveyance path.

Regarding the size of a minimum print medium to be supported, the printing apparatus in the present embodiment is designed to satisfy each inter-roller distance<the longitudinal length of the print medium. This is a condition for transferring the print medium between the rollers and preventing the print medium from being left behind between the rollers. In the present embodiment, the printing apparatus satisfies both the distance L1 between the feed roller 22 and the conveyance roller 51<the longitudinal length Lpl of the minimum print medium and the distance L2 between the conveyance roller 51 and the output roller 53<the longitudinal length Lpl of the minimum print medium.

In the present embodiment, a correct setting orientation of a print medium is an orientation in which the longitudinal direction of the print medium is aligned with the conveyance direction. A user is notified of this correct setting orientation by, for example, an illustration given to the loading unit. In the present embodiment, among print media to be supported, the minimum print medium has a short-side length Lps smaller than the distance L1 between the feed roller 22 and the conveyance roller 51. Therefore, if such a print medium is conveyed being set in an incorrect setting orientation, that is, an orientation in which the short-side direction of the print medium is aligned with the conveyance direction, the print medium is left between the feed roller 22 and the conveyance roller 51. The print medium fallen into the area between the feed roller 22 and the conveyance roller 51 is difficult to reach by inserting a hand from a feeding opening or a jam clearance opening (not illustrated) above the printing unit and is difficult to take out directly.

In this case, it is possible to use a handling method of setting another print medium again, more specifically, setting a print medium in the correct orientation in the loading unit and feeding the print medium. With this handling method, the fallen print medium can be pushed out and thus the printing medium left behind can be ejected.

However, it is difficult for users to notice this handling method, and even if the handling method is explained in a manual or the like, it is difficult for users to reach the information on the handling method. Therefore, in order to prompt a user to use this handling method, it is necessary to detect the possibility of the print medium being left behind between the rollers, and present (display) an error message to notify the user of this possibility.

Here, if the printing apparatus is set to satisfy the distance L1 between the feed roller 22 and the conveyance roller 51<the short-side length Lps of the minimum print medium, the above problem that a print medium is left behind does not occur. However, this requires the inter-roller distances to be shortened and leads to increases in cost and apparatus size. Therefore, the present embodiment employs the relationship defined as the longitudinal length Lpl of a minimum print medium to be supported>the distance L1 between the feed roller 22 and the conveyance roller 51>the short-side length Lps of the print medium. Here, the minimum print medium in the present embodiment is a business card.

Moreover, the print medium having the short-side length smaller than the distance L1 is not limited to the print medium of the minimum size.

Figure 8:
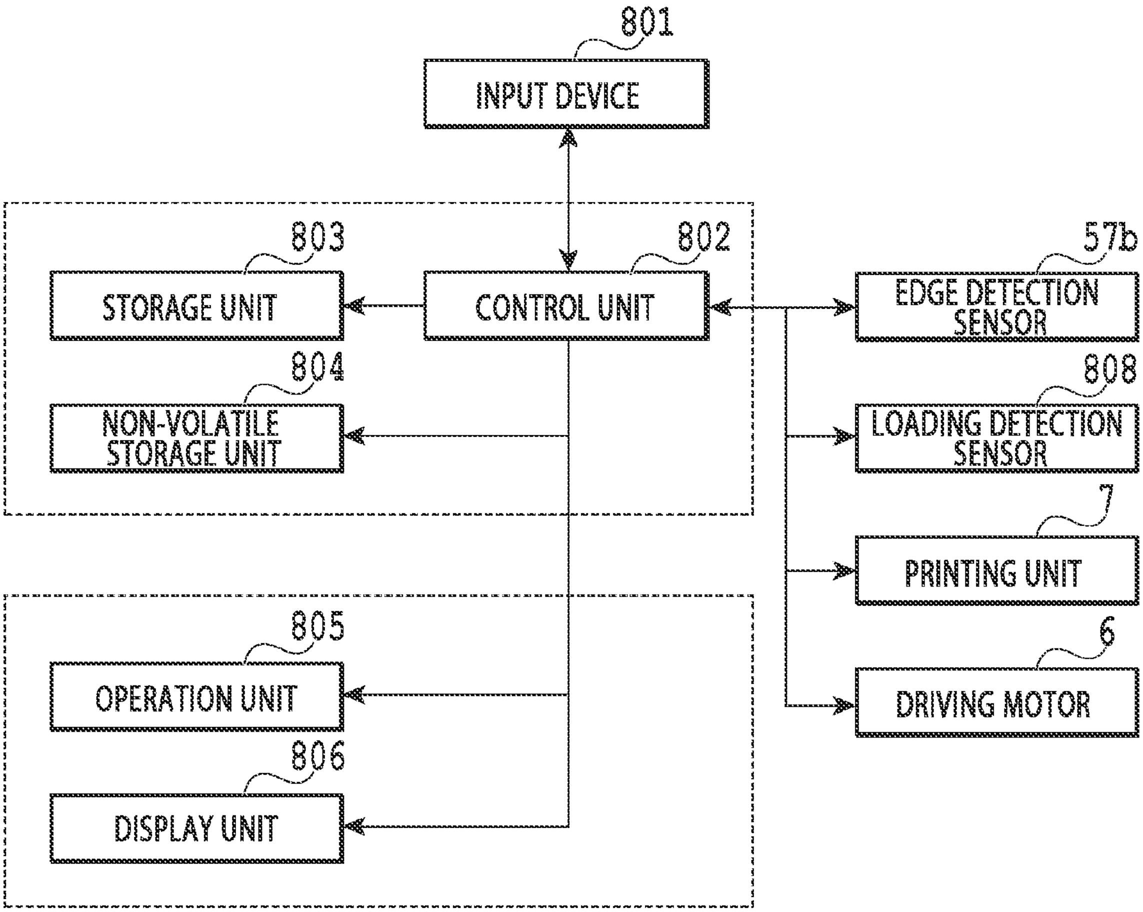
FIG. 8 is a block diagram of a control configuration involved in error detection.
Figure 9:
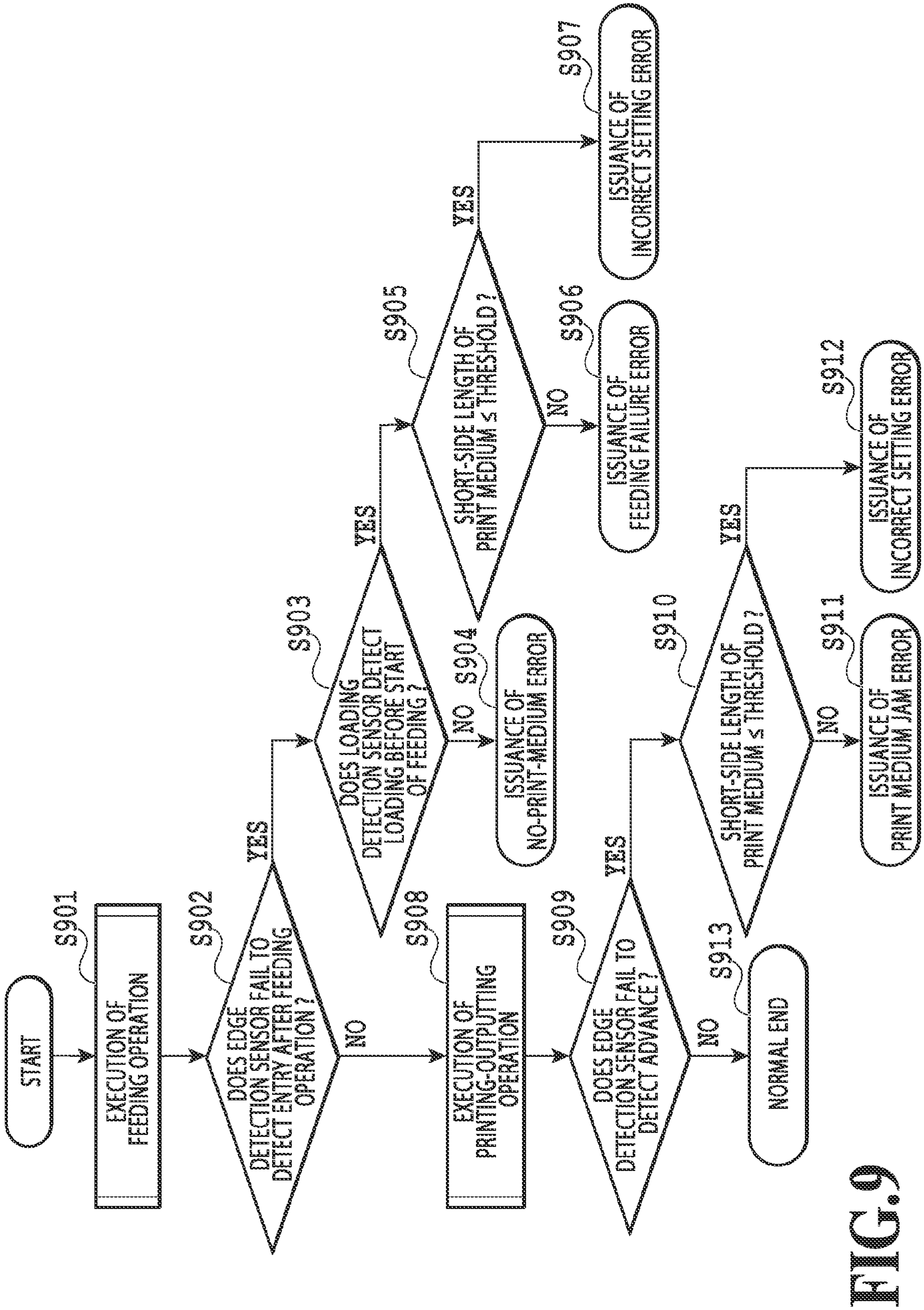
FIG. 9 is a flowchart of a series of processing for identifying an error.

Hereinafter, detection of an error such as an incorrect setting error will be described by using FIGS. 8 and 9. FIG. 8 is a block diagram of a control configuration involved in error detection. FIG. 9 is a flowchart of a series of processing for identifying an error occurring, which is executed in a printing apparatus equipped with a feeding device capable of identifying errors.

First, a user requests a control unit 802 of the printing apparatus to perform printing, copying, or the like by using an input device 801 such as a PC or smartphone or by operating an operation unit 805 equipped in the printing apparatus. The control unit 802 includes a CPU and so on. In response to reception of the request, the control unit 802 starts the processing in FIG. 9. Unless otherwise specified, the processing in each step in FIG. 9 is executed by the CPU of the control unit 802.

The CPU stores, into a volatile storage unit 803, information indicating the size of a print medium to be printed (referred to as size information), which is included in job information for the request. In addition, the CPU reads information from the loading detection sensor 808 and stores, into the storage unit 803, information indicating whether or not a print medium is loaded on the loading unit. Here, the information may be stored in a non-volatile storage unit 804.

Even after the printing apparatus is powered off, the information stored in the non-volatile storage unit 804 is not erased and can be retained. For example, in a case where an incorrect setting error to be described later is detected, error information on the incorrect setting error may be stored in the non-volatile storage unit 804. If the printing apparatus is powered off with the incorrect setting error left unresolved and then is powered on, the error information stored in the non-volatile storage unit 804 can be used to issue the incorrect setting error again.

In step S901, the CPU drives the driving motor 6 to drive the feeder unit 2, thereby performing a feeding operation. Through this feeding operation, the print medium loaded on the loading unit is fed to the conveyance unit. Hereinafter, "step S" will be abbreviated as "S".

During the normal feeding operation, a print medium edge detection sensor 57*b* detects an entry of a print medium. In the present embodiment, in S902 after S901, the CPU determines whether or not the edge detection sensor 57*b* fails to detect the leading edge of the print medium. If the determination result in this step is YES, the processing proceeds to S903. On the other hand, if the determination result in this step is NO, the processing proceeds to S908. Here, the detection of the leading edge of the print medium by the edge detection sensor 57*b* is defined as detection of an "entry" of the print medium.

In S903, the CPU determines whether or not the print medium is loaded on the loading unit at a time point before the start of the feeding operation, by using the information stored in the storage unit 803. If the determination result in this step is YES, the processing proceeds to S905. On the other hand, if the determination result in this step is NO, the processing proceeds to S904.

In S904, the CPU issues a no-print-medium error indicating that no print medium is loaded on the loading unit.

In S905, the CPU determines whether or not the short-side length of the print medium to be printed is equal to or smaller than a predetermined threshold, by using the size information stored in the storage unit 803. If the determination result in this step is YES, the processing proceeds to S907. On the other hand, if the determination result in this step is NO, the processing proceeds to S906.

If the short-side length of the print medium is larger than the predetermined threshold (NO in S905), the CPU determines that a feeding failure occurs because detection of the leading edge of the print medium fails even though the print medium is loaded. Thus, in S906, the CPU issues a feeding failure error indicating the feeding of the print medium fails.

On the other hand, if the short-side length of the print medium is equal to or smaller than the predetermined threshold (YES in S905), there is a possibility that the print medium is left behind between the feed roller 22 and the edge detection sensor 57*b* due to the incorrect setting orientation of the printing medium. Therefore, in this case, in S907, the CPU issues an incorrect setting error indicating that the setting orientation of the print medium is incorrect. Note that, in this step, there is a possibility of a jam occurring in the conveyance path before the edge detection sensor 57*b* even if the feeding does not fail or the medium is not incorrectly set. However, without having an ability to determine whether a jam is occurring, the configuration in the present embodiment issues the incorrect setting error, which is the most probable error, without any exception.

The predetermined threshold used in S905 is set to a numeric value approximately equal to the distance between the feed roller 22 and the conveyance roller 51, more specifically, to a sum of the foregoing numeric value and a margin determined in consideration of manufacturing variations in the lengths of print media and the inter-roller distances. Thus, the predetermined threshold used in S905 is set based on the distances between rollers arranged at different positions in the conveyance direction. The predetermined threshold may be set to be approximately equal to the smallest value among the inter-roller distances, or may be set to be smaller than the smallest value.

If the determination result in S902 is NO, the CPU executes a printing-outputting operation in S908.

In S909 after S908, the CPU determines whether or not the edge detection sensor 57*b* fails to detect the rear edge of the print medium. If the determination result in this step is YES, the processing proceeds to S910. On the other hand, if the determination result in this step is NO, the processing proceeds to S913, where the series of processing is normally ended. Here, the detection of the rear edge of the print medium by the edge detection sensor 57*b* is defined as detection of an "advance" of the print medium.

In S910, the CPU determines whether the short-side length of the print medium to be printed is equal to or smaller than a predetermined threshold by using the size information stored in the storage unit 803. If the determination result in this step is YES, the processing proceeds to S912. On the other hand, if the determination result in this step is NO, the processing proceeds to S911. The threshold used in S910 is equal to the threshold used in S905.

If the short-side length of the print medium is larger than the predetermined threshold (NO in S910), the CPU determines that the output of the print medium fails. Thus, in S911, the CPU issues a print medium jam error indicating that the output of the print medium fails.

On the other hand, if the short-side length of the print medium is equal to or smaller than the predetermined threshold (YES in S910), there is a possibility that the print medium is left behind between the feed roller 22 and the conveyance roller 51 as a result of setting the print medium in the incorrect setting orientation. Therefore, in this case, in S912, the CPU issues an incorrect setting error indicating the setting orientation of the print medium is incorrect. In this step, there is a possibility that a jam is occurring. However, without having an ability to determine whether a jam is occurring, the configuration in the present embodiment issues the incorrect setting error, which is an error having a higher possibility.

As described above, the size of the minimum print medium printable by the printing apparatus according to the present embodiment is the business card size. As illustrated in FIG. 7, the short-side length Lps of the business card is smaller than the distance Ls between the feed roller 22 and the edge detection sensor 57*b*. For this reason, the edge detection sensor 57*b* does not detect the advance of the business card at the moment when the business card leaves the feed roller 22. However, after leaving the feed roller 22, the business card turns into a free state where the business card is not nipped by any rollers. For this reason, depending on an inertia level of the feeding operation, the edge detection sensor 57*b* may or may not detect the advance. If the advance is not detected, the printing apparatus can issue an error without executing the following printing-outputting operation. On the other hand, if the advance is detected (NO in S902), the printing apparatus inevitably proceeds to execution of the printing-outputting operation in S908. In this case, since the business card is not nipped by the conveyance roller 51, the business card actually remains staying between the feed roller 22 and the conveyance roller 51 without being printed and output. The edge detection sensor 57*b* detects the advance of the business card during normal printing or outputting, but in this case, fails to detect the advance of the business card. Therefore, the determination result in S909 is YES, and the processing proceeds to the processing in S910 and the subsequent steps.

<Processing after Incorrect Setting Detection>

Figure 10:
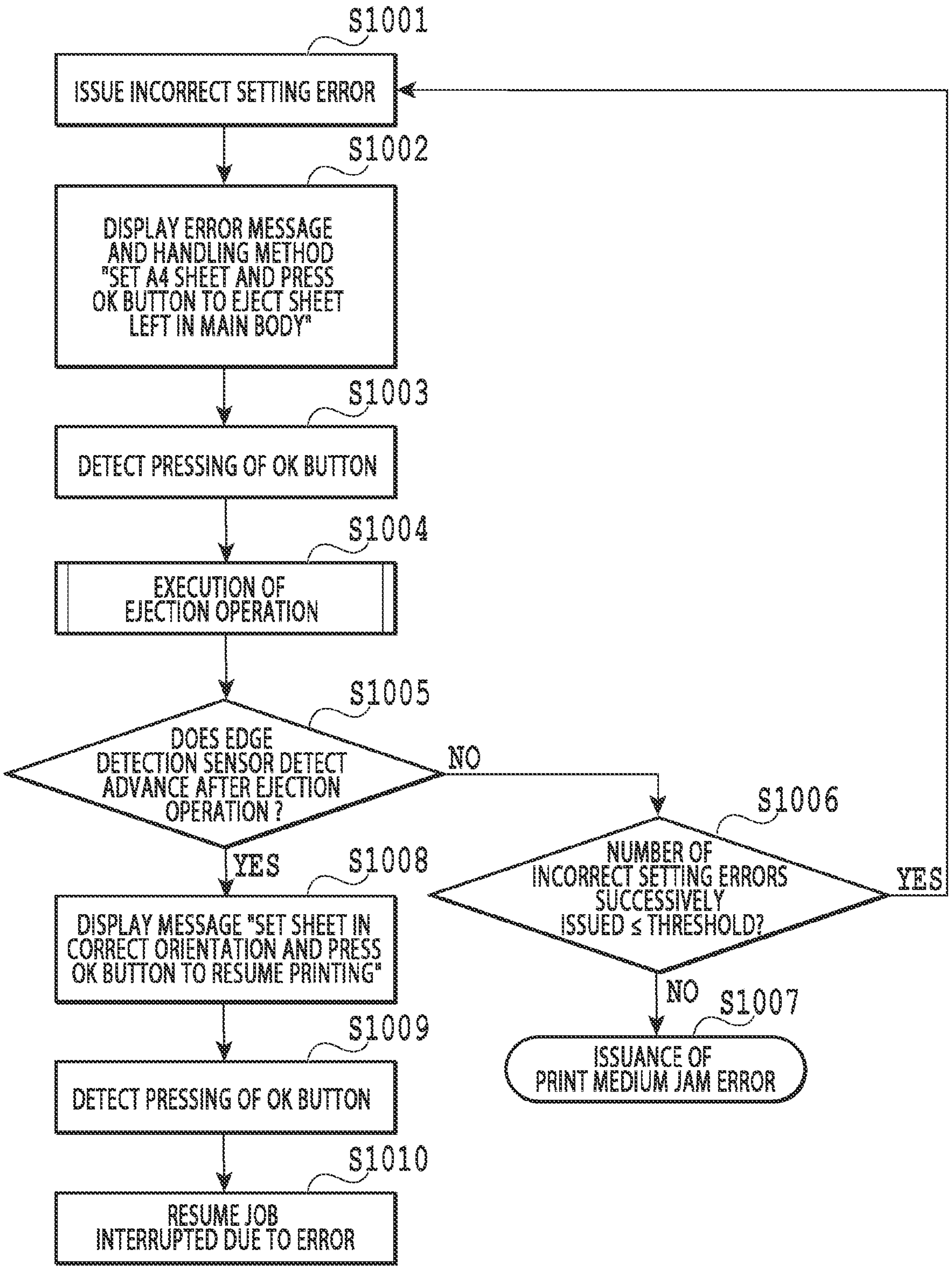
FIG. 10 is a flowchart of a series of processing after an incorrect setting error is issued.

Hereinafter, processing after an incorrect setting error is issued will be described by using FIG. 10. Unless otherwise specified, the processing in each step in FIG. 10 is executed by the CPU of the control unit 802.

In S1001, the CPU issues an incorrect setting error.

In S1002, the CPU displays, on a display unit 806, a graphical user interface for presenting an error message indicating the occurrence of the incorrect setting error and a handling method of the incorrect setting error. The information displayed as the handling method is, for example, a prompt to set a print medium of a predetermined size, and press an OK button in the operation unit 805 to convey the set print medium in order to eject the print medium left behind in the main body. Seeing the displayed prompt, a user sets a print medium of the predetermined size and presses the OK button.

In S1003, the CPU detects that the user presses the OK button.

In S1004, the CPU executes an ejection operation of the print medium. This ejection operation is an operation of feeding and outputting the set print medium and is for the purpose of pushing out the print medium left behind.

In S1005, the CPU determines whether or not the edge detection sensor 57*b* detects the advance of the set print medium of the predetermined size. If the determination result in this step is YES, that is, if the advance of the print medium is detected, the CPU determines that the print medium left behind is ejected and the processing proceeds to S1008. On the other hand, if the determination result in this step is NO, the processing proceeds to S1006.

In S1008, the CPU displays, on the display unit 806, an explanation of how to set a print medium correctly and a message prompting a user to set a print medium in the correct orientation (setting orientation) and press the OK button to feed and convey the set print medium. Seeing this message, the user sets a print medium in the correct orientation and presses the OK button.

In S1009, the CPU detects that the user presses the OK button.

In S1010, the CPU resumes the interrupted job.

On the other hand, if the edge detection sensor 57*b* does not detect the advance in S1005 (NO in S1005), the CPU determines that the ejection fails, and the processing proceeds to S1006 as described above.

In S1006, the CPU again issues the incorrect setting error, counts the number of the incorrect setting errors successively issued, and then determines whether or not the counted number is equal to or smaller than a predetermined threshold. If the determination result in this step is YES, the processing proceeds to S1001. On the other hand, if the determination result in this step is NO, the processing proceeds to S1007.

In S1007, the CPU issues a print medium jam error. The reason why the processing proceeds from S1006 to S1007 is as follows. For example, in a case where a foreign substance enters the conveyance path, there is a possibility that the incorrect setting error is issued even though the print medium is fed being set in the correct setting orientation by the user. Therefore, if the incorrect setting error is not resolved even after the pushing-out operation is executed multiple times, there is a high possibility that the print medium is jammed rather than incorrectly set. For this reason, the user is prompted to perform handling for coping with a usual print medium jam.

Effects of Present Embodiment

As described above, according to the present embodiment, a user is notified of an incorrect setting error in a case where there is a possibility that a print medium may be left or has been left behind between rollers due to an incorrect setting of the print medium. This makes it possible to prompt the user to perform appropriate handling. Thus, the usability is improved.

Second Embodiment

Figure 11:
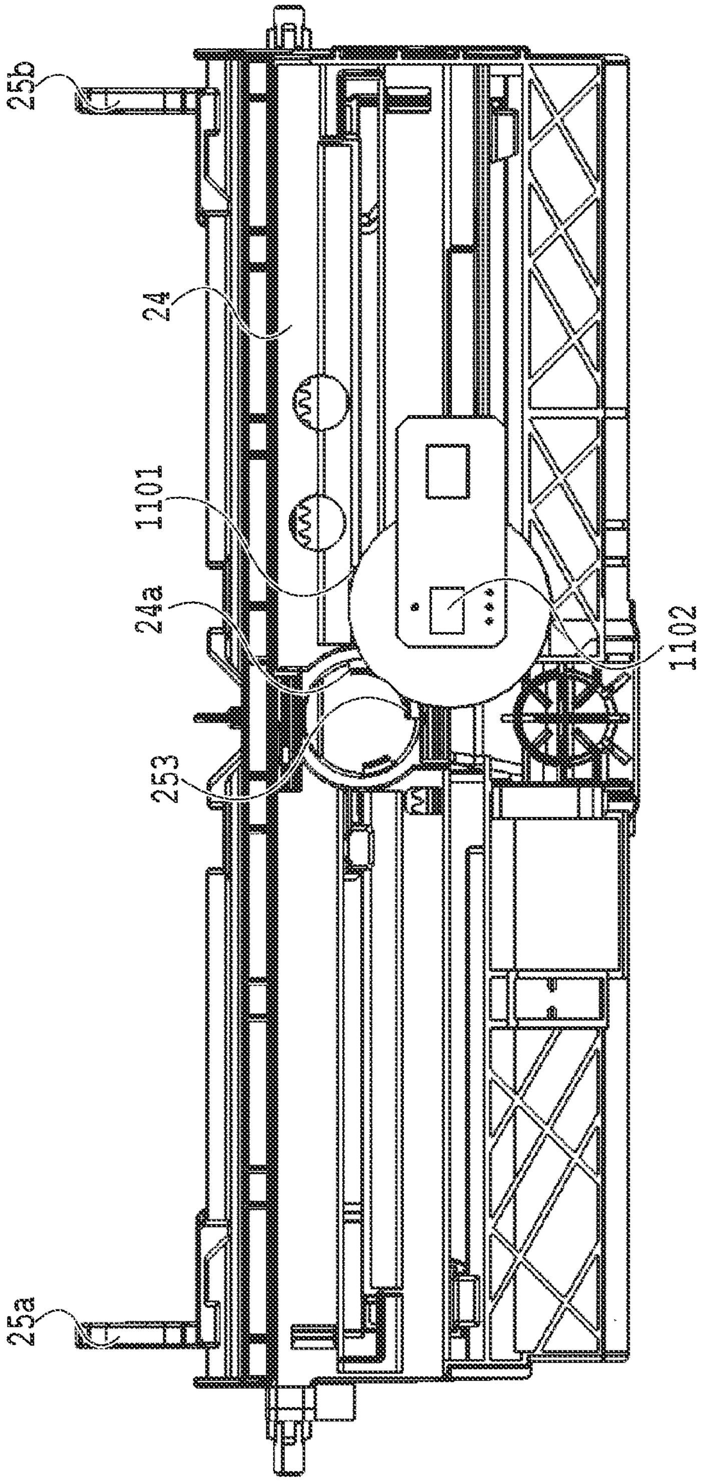
FIG. 11 is an explanatory diagram illustrating a print medium size detection unit.

Hereinafter, a second embodiment will be described by using FIG. 11. FIG. 11 is an explanatory diagram illustrating a print medium size detection unit in the present embodiment.

As illustrated in FIG. 11, a cutout portion 24*a* from which the side guide gear 253 is partially exposed is provided to the back side of the pressure plate 24 and a size detection gear 1101 meshes with the side guide gear 253 through this cutout portion 24*a*. A size detection sensor 1102, which is a rotary sensor capable of detecting an amount of rotation, is fitted in the size detection gear 1101 at the axial center. With this structure, it is possible to estimate the positions of the side guides 25 based on an output value of the size detection sensor 1102. Specifically, after the user puts the side guides 25 along the side surfaces of a print medium, the size of the print medium set by the user can be recognized by reading the value of the size detection sensor 1102.

However, a printing apparatus supporting various print medium sizes requires a highly-accurate size detection unit in order to determine the sizes of all the media. In this regard, the size detection unit as described in the present embodiment should be able to determine only four levels of print medium sizes (specifically. A4, A5, 4×6 inches, and smaller size) that are highly-frequently used by users. In this case, the business card size, which is the size of the minimum print medium printable by the printing apparatus, is classified into "smaller size" even if the business card is set in the correct setting orientation. In other words, the printing apparatus is able to recognize that a print medium of a small side is set, but is not able to detect a mistake in the setting orientation. In the case of employing the configuration as described above, the printing apparatus even equipped with a sheet width detection unit is not able to interrupt the feeding before the feeding is started, and has to determine whether or not the print medium is incorrectly set based on the output of the edge detection sensor 57*b* after the feeding is started.

Although the short-side size of the print medium is stored into the storage unit based on the job information in the first embodiment, a problem may occur in the aforementioned method in which the user reads the value of the size detection sensor 1102 and sets the size. That is, this method is not able to issue an error appropriately in a case where there is a mismatch between the size of a print medium specified in a print job and the size of a print medium actually set due to a setting mistake by the user.

For this reason, in the present embodiment, in the case where the size detection sensor is equipped, the information on the size of the print medium determined by the size detection sensor is written into the storage unit. Then, the print medium is fed and the incorrect setting error is issued if the error determination criterion similar to that in the first embodiment is satisfied based on the output of the edge detection sensor.

Although the size detection unit of the rotary sensor type is described in the present embodiment, a size detection unit other than that may be employed. For example, a method of arranging multiple optical sensors on the loading surface in order to detect the size may be employed, or a method of detecting the positions of the side guides by using a linear senor may be employed.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to provide a printing apparatus with usability prevented from being lowered.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-160330, filed Oct. 4, 2022, which is hereby incorporated by reference herein in its entirety

What is claimed is:

1. A printing apparatus comprising:
a storage unit configured to store size information of a print medium;
a feeder unit configured to feed a print medium loaded on a loading unit;
a plurality of rollers arranged in a conveyance path of the print medium and configured to convey the print medium;
a first sensor configured to detect an edge of the print medium being conveyed by the rollers;
a second sensor configured to detect whether the print medium is loaded before the conveyance of the print medium is started; and
a control unit configured to execute processing for identifying an error occurring in the conveyance of the print medium, wherein
the control unit issues a first error concerning an orientation of the print medium based on a detection result of the first sensor and the size information stored in the storage unit,
wherein, in a case where the first sensor fails to detect the edge of the print medium being conveyed, the control unit determines whether or not a short-side length of the print medium is equal to or shorter than a predetermined threshold by using the size information, and issues the first error if the short-side length is equal to or shorter than the predetermined threshold,
wherein, in a feeding operation by the feeder unit, in a case where the first sensor fails to detect a leading edge of the print medium and the second sensor detects no-loading of the print medium, the control unit issues a second error as an error in a case where the print medium is not loaded on the loading unit,
wherein, in a case where the second sensor detects loading of the print medium and the short-side length of the print medium specified in the size information is equal to or shorter than the predetermined threshold, the control unit issues the first error,
wherein, in a case where the second sensor detects the loading of the print medium and the short-side length of the print medium specified in the size information is longer than the predetermined threshold, the control unit issues a third error as an error in a case where the feeding of the print medium fails, and
wherein, in an outputting operation of outputting the print medium on which printing is performed to a delivery unit, in a case where the first sensor fails to detect a rear edge of the print medium and the short-side length is equal to or shorter than the predetermined threshold, the control unit issues the first error.

2. The printing apparatus according to claim 1, wherein
the control unit receives the size information set by a user and stores the received size information into the storage unit.

3. The printing apparatus according to claim 2, further comprising a third sensor configured to detect the size of the print medium, wherein
a gear of the third sensor meshes with a gear of a side guide.

4. The printing apparatus according to claim 1, wherein
in the outputting operation, in a case where the first sensor fails to detect the rear edge and the short-side length is longer than the predetermined threshold, the control unit issues a fourth error as an error in a case where the print medium is jammed.

5. The printing apparatus according to claim 4, wherein
the plurality of rollers are provided at different positions in a conveyance direction, and
the predetermined threshold is set based on a distance between the rollers provided at the different positions.

6. The printing apparatus according to claim 5, wherein the predetermined threshold is set to be approximately equal to the smallest value of the distance between the rollers or to be smaller than the smallest value.

7. The printing apparatus according to claim 1, further comprising a display unit configured to display information on the error occurring and a handling method of the error.

8. The printing apparatus according to claim 7, wherein what is displayed as the handling method on the display unit is a prompt to set a print medium of a predetermined size in a correct orientation and convey the set print medium.

9. The printing apparatus according to claim 8, wherein after execution of the handing method, in a case where the first sensor fails to detect a rear edge of the set print medium of the predetermined size, the control unit issues the first error again and counts the number of the first errors successively issued.

10. The printing apparatus according to claim 9, wherein in a case where the number counted by the control unit is longer than a predetermined threshold, the control unit issues, instead of the first error, a fourth error as an error in a case where the print medium is jammed.

11. The printing apparatus according to claim 1, further comprising a non-volatile storage unit, wherein in a case where the first error is issued, error information on the first error is stored in the non-volatile storage unit, and in a case where the printing apparatus is powered off with the first error left unresolved and then is powered on, the control unit issues the first error again by using the error information.

12. A control method for a printing apparatus including:

a storage unit configured to store size information of a print medium;

a feeder unit configured to feed a print medium loaded on a loading unit;

a plurality of rollers arranged in a conveyance path of the print medium and configured to convey the print medium;

a first sensor configured to detect an edge of the print medium being conveyed by the rollers;

a second sensor configured to detect whether the print medium is loaded before the conveyance of the print medium is started; and a control unit configured to execute processing for identifying an error occurring in the conveyance of the print medium, the control method comprising causing the control unit to issue a first error concerning an orientation of the print medium based on a detection result of the first sensor and the size information stored in the storage unit, wherein, in a case where the first sensor fails to detect the edge of the print medium being conveyed, the control unit determines whether or not a short-side length of the print medium is equal to or shorter than a predetermined threshold by using the size information, and issues the first error if the short-side length is equal to or shorter than the predetermined threshold, wherein, in a feeding operation by the feeder unit, in a case where the first sensor fails to detect a leading edge of the print medium and the second sensor detects no-loading of the print medium, the control unit issues a second error as an error in a case where the print medium is not loaded on the loading unit, wherein, in a case where the second sensor detects loading of the print medium and the short-side length of the print medium specified in the size information is equal to or shorter than the predetermined threshold, the control unit issues the first error, wherein, in a case where the second sensor detects loading of the print medium and the short-side length of the print medium specified in the size information is longer than the predetermined threshold, the control unit issues a third error as an error in a case where the feeding of the print medium fails, and wherein, in an outputting operation of outputting the print medium on which printing is performed to a delivery unit, in a case where the first sensor fails to detect a rear edge of the print medium and the short-side length is equal to or shorter than the predetermined threshold, the control unit issues the first error.

13. A non-transitory computer readable storage medium storing a program causing a computer to execute a control method for a printing apparatus including:

a storage unit configured to store size information of a print medium;

a feeder unit configured to feed a print medium loaded on a loading unit;

a plurality of rollers arranged in a conveyance path of the print medium and configured to convey the print medium;

a first sensor configured to detect an edge of the print medium being conveyed by the rollers;

a second sensor configured to detect whether the print medium is loaded before the conveyance of the print medium is started; and a control unit configured to execute processing for identifying an error occurring in the conveyance of the print medium, the control method comprising causing the control unit to issue a first error concerning an orientation of the print medium based on a detection result of the first sensor and the size information stored in the storage unit, wherein, in a case where the first sensor fails to detect the edge of the print medium being conveyed, the control unit determines whether or not a short-side length of the print medium is equal to or shorter than a predetermined threshold by using the size information, and issues the first error if the short-side length is equal to or shorter than the predetermined threshold, wherein, in a feeding operation by the feeder unit, in a case where the first sensor fails to detect a leading edge of the print medium and the second sensor detects no-loading of the print medium, the control unit issues a second error as an error in a case where the print medium is not loaded on the loading unit, wherein, in a case where the second sensor detects loading of the print medium and the short-side length of the print medium specified in the size information is equal to or shorter than the predetermined threshold, the control unit issues the first error, wherein, in a case where the second sensor detects loading of the print medium and the short-side length of the print medium specified in the size information is longer than the predetermined threshold, the control unit issues a third error as an error in a case where the feeding of the print medium fails, and wherein, in an outputting operation of outputting the print medium on which printing is performed to a delivery unit, in a case where the first sensor fails to detect a rear edge of the print medium and the short-side length is equal to or shorter than the predetermined threshold, the control unit issues the first error.

* * * * *